3,333,021
PROCESS OF CURING UNSATURATED POLYESTER RESIN COMPOSITIONS

Albert Geipert, Darmstadt, Germany, assignor to Elecktrochemische Werke Muenchen A.G., Hoellriegelskreuth, near Munich, Germany, a corporation of Germany
No Drawing. Filed Aug. 22, 1963, Ser. No. 303,922
Claims priority, application Germany, Aug. 25, 1962, R 33,388
13 Claims. (Cl. 260—863)

The present invention relates to an improved process of curing, i.e. completely polymerizing unsaturated polyester resin compositions. The term "unsaturated polyester resin compositions" as used hereinafter and in the claims attached hereto designates mixtures of unsaturated polyesters and unsaturated monomeric compounds which can be copolymerized therewith and cross-linked thereto and which are capable of forming a polymerization product cross-linked in a three-dimensional manner.

It is known to completely harden or cure such unsaturated polyester resin compositions by means of peroxides and vanadium compounds such as vanadium salts of organic or inorganic acids, vanadium compounds, and solutions of vanadium oxides. However, such curing requires considerably prolonged reaction times. To reduce the reaction time to a degree that curing becomes practically and economically possible, the vanadium compounds must be used in such concentrations that the cured resin is frequently discolored on curing. In some instances such an increase in the amount of vanadium compounds does not cause curing in a satisfactory manner even after a prolonged reaction time.

Redox systems representing a combination of a peroxide with a reducing sulfur compound are also known as improved curing agents. Such redox systems do not cause any appreciable discoloration of the polymerization product. However, the use of this combination does not result in a satisfactory curing when initiated at room temperature. This is the reason why such systems have not been employed effectively for curing unsaturated polyester resin compositions.

It is one object of the present invention to provide a simple and effective process of completely hardening or curing unsaturated polyester resin compositions in the presence of organic peroxides and vanadium compounds which process is free of the disadvantages of the heretofore known processes and which permits reduction of the polymerization time without an increase in the concentration of the vanadium compounds.

Other objects of the present invention and advantageous features thereof will become apparent as the description proceeds.

In principle, the process according to the present invention consists in effecting complete hardening or curing of unsaturated polyester resin compositions in the presence of organic peroxides and vanadium compounds by the addition of small amounts of a reducing sulfur compound.

The combination of peroxides, vanadium compounds, and reducing sulfur compounds according to the present invention permits to reduce the vanadium content without prolongation of the polymerization time. As a result thereof, no appreciable discoloration of the cured resin takes place. The new process thus permits to produce substantially colorless cured articles from unsaturated polyester resin compositions at room temperature. The resulting cured articles have proved to be highly resistant in various tests. If coloration of the article does not impede their use, it is possible to employ increased amounts of vanadium compounds in combination with the reducing sulfur compounds whereby a considerable acceleration of the curing reaction is achieved. The procedure according to the present invention has the further advantage that peroxides can be used which heretofore could not be employed, in combination with vanadium compounds alone, for cold curing of difficultly polymerizable resins.

Another especially important advantage of the new process according to the present invention is the considerable reduction in the deformation time of laminated products. The term "deformation time" indicates the time within which a laminate consisting of an unsaturated polyester resin composition and a glass fiber mat does not show any "white fracture" i.e. does not show separation of the resin from the glass fiber mat, on exposure to mechanical stresses such as, for instance, when removing the laminate from a mold.

Thus the curing accelerator system according to the present invention which consists of a peroxide, a vanadium compound, and a reducing sulfur compound assures complete curing even if curing is initiated at room temperature. The curing time is considerably reduced by the addition of the reducing sulfur compounds. Discoloration of the cured article can be considerably decreased or, respectively, completely eliminated where this is required because the system according to the present invention achieves complete curing with considerably smaller amounts of vanadium compounds in at least the same period of time, but usually within a shorter period of time, as when proceeding according to the known processes.

Unsaturated polyesters which are used as the one component of the polyester resin compositions according to the present invention are, for instance, polyesters as they are obtained by esterifying preferably ethylenically unsaturated di- or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2'-dihydroxy ethyl ether); triethylene glycol (ethylene glycol bis-(2-hydroxy ethyl ether); propanediol-1,2; butanediol-1,3; 2,2-dimethyl propanediol-1,3; butene(2)-diol-1,4, glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, and others, or by aromatic dicarboxylic acids, such as phthalic acid, tetrahydrophthalic acid, and others and their anhydrides. The acids used as well as the alcohols employed may be substituted by other substituents, preferably by halogen. Examples of suitable halogenated acids are, for instance, tetrachloro phthalic acid; 1,4,5,6,7,7-hexachloro bicyclo (2,2,1)heptene(5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, the diallyl maleate, and others, which are copolymerizable with said polyesters.

Vanadium compounds which are suitable for the purpose of the present invention are compounds of trivalent to pentavalent vanadium. Such compounds are, for instance, (a) Compounds of trivalent to pentavalent vanadium wherein the vanadium is present as the cationic component or in said cationic component, such as vanadium salts of inorganic and organic acid, for instance, vanadium trichloride ($VCl_3$), vanadyl chloride ($VOCl_2$), vanadyl-p-toluene sulfonate, vanadyl acetate, vanadyl oxalate, vanadium naphthenate, the vanadium salt of kojic acid, and others; complex salts of organic acids such as the vanadyl complex salt of malic acid, citric acid, tartaric acid, ascorbic acid, amino acetic acid (glycine) and other amino acids; complex compounds with other organic compounds such as vanadium and vanadyl complex compounds with acetyl acetone, acetyl benzoyl acetone, oxalacetic acid ester, and other organic compounds which contain the group

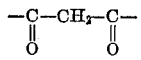

as well as vanadium and vanadyl complex compounds of ethylene diamine tetra-acetic acid;

(b) Esters of acids of vanadium such as the tertiary butyl orthovanadate, heteropolyacids of vanadium and their esters, for instance, the polyvanadium phosphoric acid and the tertiary butyl ester of polyvanadium phosphoric acid, and others.

(c) Solutions of vanadium oxides. These vanadium compounds are preferably used in the form of solutions in such organic solvents which are miscible with the unsaturated polyester resin composition and which have a sufficiently high dissolving power for the vanadium compounds. Suitable solvents are, for instance, dimethyl phthalate, isopropyl alcohol, methyl alcohol, toluene, xylene, dimethyl formamide, acetyl acetone, aceto acetic acid ethyl ester, N-methyl pyrrolidone, acid phosphoric acid butyl ester, styrene and other liquid monomers used as components of such polyetser resin compositions, or mixtures thereof. The vanadium compound is preferably incorporated in amounts between about 0.000002%, by weight, and 1.0%, by weight, calculated for vanadium metal, of the unsaturated polyester resin.

Suitable peroxides are representatives of all groups of organic peroxides such as hydroperoxides, especially tertiary hydroperoxides such as cumene hydroperoxide, tertiary butyl hydroperoxide, 2,5-dimethyl-2,5-dihydroperoxy hexane, and others;
acyl peroxides such as diacetyl peroxide, benzoyl peroxide, lauroyl peroxide, and others;
keto peroxides such as methyl ethyl ketone peroxide, methyl isobutyl ketone peroxide, trimeric acetone peroxide, or cyclohexanone peroxide, and others;
peresters such as tertiary butyl perbenzoate, tertiary butyl permaleic acid ester, tertiary butyl perphthalate, tertiary butyl per(α-ethyl)-hexanoate, peresters of 2,5-dimethyl-2,5-dihydroperoxy hexane and formic acid or acetic acid, and others;
peroxides of the type of 1,1'-dihydroxy diheptyl peroxide;
peroxides of the general formula

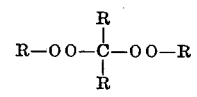

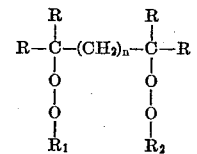

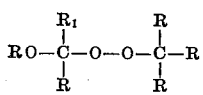

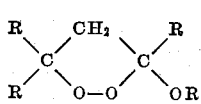

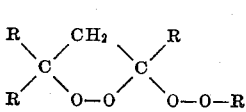

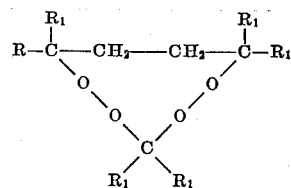

In said formulas:

R indicates the same or different alkyl, aralkyl, or aryl radicals, $R_1$ and $R_2$ indicate the same or different alkyl or aralkyl radicals, and $n$ indicates the integers from 1 to 4.

Such compounds are, for instance, 2,2-bis-(tertiary butyl peroxide) butane; 2,5-dimethyl-2,5-bis-(tertiary butyl peroxy) hexane; 2,5-dimethyl-2,5-bis-(tertiary amyl peroxy) hexane; 2-ethoxy-2-(tertiary butyl peroxy) ethane; 3,5,5-trimethyl-3-hydroxy-1,2-dioxolane; 3,5,5-trimethyl - 3 - (tertiary butyl peroxy) - 1,2 - dioxolane; 1,1,4,4,7,7-hexamethyl-2,3,5,6 - tetraoxacyclononane, and others.

The group of per acids is less suitable for the purpose of the present invention because it is rather difficult to prevent the formation of gas bubbles and their inclusion in the cured unsaturated polyester resin compositions, when using such per acids. Curing with such per acids although apparently proceeding satisfactory, however, yields hardened articles which, with respect to their dielectric loss index ($tg\delta$) determined according to the DIN 53,483 method, are on insufficient quality because crosslinking and, as a result thereof, hardening does not proceed as completely, for instance, with commercial peracetic acid as with the other above mentioned types of organic peroxides. If, for instance, the polyester resin composition I described hereinafter is cured at room temperature with a catalyst system consisting of 2 parts, by weight, of a 40%, by weight, peracetic acid solution, 0.1 part, by weight, of the vanadium accelerator 3 as given hereinafter, and 0.5 part, by weight, of the reducing sulfur compound F as described hereinafter, said parts, by weight, being calculated for 100 parts, by weight, of the unsaturated polyester resin composition I, and if, thereafter, the cured plastic is annealed at 100° C. for 2 hours, its dielectric loss index $tg\delta$ is found to be $9.4 \times 10^{-3}$.

When proceeding in exactly the same manner but using, in place of peracetic acid, a keto peroxide, namely the peroxide catalyst c described hereinafter, the dielectric loss index $tg\delta$ is $6.2 \times 10^{-3}$.

Similarly, when using the same polyester resin composition I and a catalyst composition consisting of 2 parts, by weight, of a 40%, by weight, peracetic acid solution, 0.1 part, by weight, of the vanadium accelerator 4 as given hereinafter, and 0.5 part, by weight, of the reducing sulfur compound ... as described hereinafter, per 100 parts, by weight, of said unsaturated polyester resin composition, the dielectric loss index $tg\delta$ is found to be When proceeding in exactly the same manner but using, in place of peracetic acid, the same amount of the peroxide catalyst g described hereinafter, the dielectric loss index $tg\delta$ is $6.2 \times 10^{-3}$.

The amounts of peroxide curing catalyst added should preferably not exceed about 3% of the unsaturated polyester resin.

Suitable reducing sulfur compounds are, for instance:
Aliphatic and aromatic mercaptans, such as butyl mercaptan, hexyl mercaptan, octyl mercaptan, lauryl mercaptan, tertiary dodecyl mercaptan, thiophenol, p-chloro thiophenol, 2-mercapto benzothiazole and their derivatives, such as 2-mercapto ethanol and other thioglycols and their esters, such as isobutyric acid 2-mercapto ethyl ester, mercapto ethylamine hydrochloride, and other an amino group carrying mercaptans or their acid addition salts, mercapto groups containing acids such as thioglycolic acid, thiosalicyclic acid, mercapto succinic acid (thiomalic acid), mercapto propionic acid, and their derivatives, such as their esters, for instance, propanediol dimercapto acetate, glycol dimercapto acetate, thioglycolic acid n-butyl ester, thioglycolic acid iso-octyl ester; mercapto acetic acid 2-ethoxy ester, polymeric mercapto acetic acid allyl ester, propane triol tris-mercapto acetic acid ester, diethylene glycol bis-mercapto acetic acid ester, pentaerythritol tetra-mercapto acetic acid ester, mercapto acetic acid 2-ethyl hexyl ester, mercapto propionic acid 2-hydroxy ethyl ester; aliphatic and aromatic and aliphatic and aromatic sulfinic acids and their esters such as ethyl sulfinic acid, dodecyl sulfinic acid, p-toluene sulfinic acid, salicyl sulfinic acid; as well as mixtures of such sulfur compounds.

The reducing sulfur compounds can be used as such or in the form of their solutions. Suitable solvents are, in addition to the conventional organic solvents such as esters, alcohols, and ketones, especially plasticizers and monomers which form a component of the unsaturated polyester resin compositions.

It is often of advantage to dissolve the vanadium compound and the sulfur compound in the same solvent or to mix solutions of the two components and to use such mixtures as accelerator solutions.

Especially suitable for the purpose of the present invention is, of the peroxides, the group of peresters and more particularly the tertiary butyl-per-($\alpha$-ethyl) hexanoate. Of the sulfur compounds there are especially suitable the mercapto compounds, more particularly acids which carry a mercapto group and their esters, especially mercapto succinic acid. The use of the last mentioned acid is preferred not only because an exceptionally high additional acceleration of the curing time can be achieved therewith but also because the acid does not cause discomfort due to its less disagreeable color.

It may be of advantage to add the components of the system according to the present invention separately to the polyester resin to be cured. Thus, for instance, it is possible, to add the peroxide to part of the unsaturated polyester resin composition while the vanadium compound and the sulfur compound are admixed to another part thereof. When combining and mixing both parts of unsaturated polyester resin composition containing the hardening and accelerating agent, curing of the polyester resin composition takes place as desired.

When producing molded articles which are reinforced by glass fibers, especially when producing glass fiber laminates, the peroxide compound and the sulfur compound may be coated on the glass fiber mat in a manner known per se. The other active component of the accelerator system according to the present invention, i.e. the vanadium compound is admixed to the unsaturated polyester resin composition. On impregnating the glass fiber with such an unsaturated polyester resin composition, rapid and complete curing of the laminate takes place.

A similar process may be employed when coating a surface with an unsaturated polyester resin lacquer composition. Thereby, either the peroxide or the vanadium compound and the sulfur compound may be applied to the base to be lacquer coated while the other component of the accelerator system according to the present invention is dissolved in the lacquer.

The following examples serve to illustrate the present invention without, however, limiting the same thereto.

The following unsaturated polyester resin compositions were used in said examples:

POLYESTER RESIN COMPOSITION I

A mixture of 70 parts, by weight, of an unsaturated polyester obtained by esterification of 2 moles of maleic acid and 1 mole of phthalic acid with 3.3 moles of propanediol to which 30 parts, by weight, of styrene were admixed, said styrene containing 0.01 part, by weight, of hydroquinone.

POLYESTER RESIN COMPOSITION II

A mixture of 70 parts, by weight, of an unsaturated polyester obtained from 2.7 moles of maleic acid anhydride, 4.4 moles of phthalic acid anhydride, 3.9 moles of ethylene glycol, and 3.4 moles of diethylene glycol (2.2'-dihydroxy ethyl ether) with 30 parts, by weight, of styrene.

POLYESTER RESIN COMPOSITION III

A mixture of 75 parts, by weight, of an unsaturated polyester obtained by esterification of 1.5 moles of maleic acid anhydride and 3.5 moles of phthalic acid anhydride with 5 moles of 1.3-butanediol with 25 parts, by weight, of styrene to which 0.02 part, by weight, of hydroquinone were added.

The following peroxide catalysts were used in the examples.

| Symbol in the tables: | Peroxide catalyst |
| --- | --- |
| a | Mixture of 75 parts, by weight, of tertiary butyl hydroperoxide and 25 parts, by weight, of di-tertiary butyl peroxide. |
| b | Commercial 70%, by weight, solution of cumene hydroperoxide. |
| c | 40%, by weight, solution of methyl ethyl ketone peroxide in dimethyl phthalate. |
| d | 50%, by weight, solution of cyclohexanone peroxide in triethyl phosphate. |
| e | 50%, by weight, paste of benzoyl peroxide in dimethyl phthalate. |
| f | 50%, by weight, solution of tertiary butyl peracetate in dimethyl phthalate. |
| g | Commercial peroctanoic acid ester with a content of 90%, by weight, of tertiary butyl-per-($\alpha$-ethyl) hexanoate. |
| h | 40%, by weight, solution of 2,2-bis (tertiary butyl peroxy) butane in dibutyl phthalate. |
| i | 2-ethoxy - 2 - (tertiary butyl peroxy) ethane-($\alpha$-tertiary butyl peroxy ethyl ether) containing 80%, by weight, thereof. |
| k | 3,5,5-trimethyl - 3 - hydroxy dioxolane-(1,2) containing 65%, by weight, thereof. |
| l | 50%, by weight, solution of 1,1,4,4,7,7-hexamethyl - 2,3,5,6 - tetraoxacyclononane in styrene. |
| m | Solution of 14 parts, by weight, of hydrogen peroxide and 20 parts, by weight, of 1-hydroxy-1-hydroperoxy dicyclohexyl peroxide in 66 parts, by weight, of triethyl phosphate. |

The following vanadium promoters or accelerators were used in the examples.

| Symbol in the tables: | Vanadium promoter |
| --- | --- |
| 1 | Solution of vanadyl chloride in methanol. |
| 2 | Solution of vanadyl chloride in isopropanol. |
| 3 | Solution of vanadium pentoxide in acid phosphoric acid butyl ester. |
| 4 | Solution of vanadyl-p-toluene sulfonate in a mixture of isopropanol and xylene. |
| 5 | Solution of vanadyl-p-toluene sulfonate in a solution of 3 parts, by weight, of p-toluene sulfonic acid and 7 parts, by weight, of isopropanol. |
| 6 | Solution of vanadyl oxalate in methanol. |
| 7 | Solution of vanadium naphthenate in xylene. |

Symbol in the
tables:      Vanadium promoter
8 _____ Solution of the acetyl acetone-vanadyl complex compound in acetyl acetone.
9 _____ Solution of tri-tertiary butyl orthovanadate in a mixture of two parts, by weight, of tertiary butanol and 1 part, by weight, of toluene.

All these solutions were adjusted to a concentration corresponding to a content of 1%, by weight, of vanadium.

The following reducing sulfur compounds were used in the examples.

Symbol and       Reducing sulfur compound
table:
A _____ 2-mercapto ethanol
$$HS—CH_2—CH_2—OH$$
B _____ 20%, by weight, solution of lauryl mercaptan in dibutyl phthalate
$$HS—[CH_2]_{11}—CH_3$$
C _____ Thioglycolic acid-n-butyl ester
$$HS—CH_2—COO—n\text{-butyl}$$
D _____ 20%, by weight, solution of thioglycolic acid isooctylester in dimethyl phthalate
$$HS—CH_2—COO—\text{iso-octyl}$$
E _____ 20%, by weight, solution of glycol dimercapto acetate in dimethyl phthalate
$$HS—CH_2—OOO—CH_2CH_2—OOC—CH_2—SH$$
F _____ 20%, by weight, solution of mercapto succinic acid in 95%, by weight, isopropanol
$$HOOC—CH_2—CH(SH)—COOH$$
H _____ 10%, by weight, solution of 2-mercapto benzothiazole in ethyl acetate.

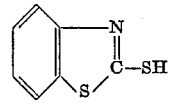

N _____ 50%, by weight, solution of p-toluene sulfinic acid in acetophenone.
O _____ 50%, by weight, solution of benzene sulfinic acid in acetophenone.
P _____ 20%, by weight, solution of butyl mercaptan in dibutyl phthalate.
Q _____ 20%, by weight, solution of octyl mercaptan in dibutyl phthalate.
R _____ 20%, by weight, solution of tertiary dodecyl mercaptan in dibutyl phthalate.
S _____ Thioglycolic acid.
T _____ 20%, by weight, solution of mercapto ethylamine hydrochloride in methanol.
V _____ 20%, by weight, solution of mercapto acetic acid 2-hydroxy ethyl ester in isopropanol
$$HS—CH_2—COO—CH_2—CH_2—OH$$
W _____ 20%, by weight, solution of diethylene glycol bis-mercapto acetic acid ester in isopropanol

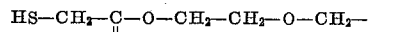

X _____ 20%, by weight, solution of propanetriol trismercapto acetic acid ester in isopropanol.

Example 1

This example demonstrates in what manner the curing speed of an unsaturated polyester resin composition is increased by the addition of reducing sulfur compounds in comparison to compositions which contain only the peroxide curing catalyst and the vanadium promoter (accelerator); see Table I.

In each of these tests, 50 g. of the unsaturated polyester resin composition were mixed with the additives given in columns 3 to 5 in the amounts mentioned. The mixtures were allowed to stand in plastic containers at room temperature, i.e. at 15–25° C. The tempertaure of the mixture was measured from time to time by means of a thermo element and it was determined when the temperature maximum was attained. This time corresponds, as is well known, approximately to the curing time. Furthermore, it was observed and noted after which period of time the composition was converted into a gel. The results obtained in these tests are compiled in the attached Table I. The amounts in percent given therein are amounts in percent, by weight, calculated for the polyester resin amount used in these tests.

These tests show the especially favorable effect of mercapto succinic acid (tests No. 10, 11, and 12).

Example 2

The procedure was the same as described in Example 1 except that discoloration of the cured article was judged after curing. The results are compiled in Table II the symbols given therein corresponding to those of Table I.

It is evident from these tests that the addition of reducing sulfur compounds results in a considerable reduction of the amount of vanadium accelerator to be added without an increase in curing time. In most instances the curing time was even considerably reduced. As is evident from the last column of Table II, the procedure according to the present invention also results in a considerably reduced discoloration of the cured article. Mercapto succinic acid also produces excellent results in this respect.

TABLE 1

| Test No. | Unsaturated polyester resin composition | Type and amount of peroxide | Type and amount of vanadium accelerator | Type and amount of reducing sulphur compound | Time required for complete gelling (gell time) in minutes | Time required to achieve temperature peak (time of exotherm), in minutes |
|---|---|---|---|---|---|---|
| 1 | I | 2% (h) | 0.1% (5) |  | 6 | 13 |
|  | I | 2% (h) | 0.1% (5) | 0.5% (B) | 2 | 4 |
| 2 | I | 2% (m) | 0.1% (4) |  | 7 | 13 |
|  | I | 2% (m) | 0.1% (4) | 0.5% (F) | 2 | 5 |
| 3 | I | 2% (c) | 0.1% (3) |  | 7 | 13 |
|  | I | 2% (c) | 0.1% (3) | 0.5% (F) | 2 | 5 |
| 4 | I | 2% (a) | 0.1% (4) |  | 252 |  |
|  | I | 2% (a) | 0.1% (4) | 0.5% (E) | 2 | 10 |
| 5 | II | 2% (i) | 0.1% (4) |  | 15 | 40 |
| 6 | II | 2% (f) | 0.1% (4) |  | 7 | 22 |
| 7 | III | 2% (f) | 0.5% (7) |  | 28 | 50 |
|  | III | 2% (f) | 0.5% (7) | 3% (H) | 2 | 9 |
| 8 | II | 2% (i) | 0.3% (2) |  | 2 | 14 |
| 9 | II | 2% (i) | 0.1% (8) |  | 12 | 30 |

TABLE I—Continued

| Test No. | Unsaturated polyester resin composition | Type and amount of peroxide | Type and amount of vanadium accelerator | Type and amount of reducing sulphur compound | Time required for complete gelling (gel time) in minutes | Time required to achieve temperature peak (time of exotherm), in minutes |
|---|---|---|---|---|---|---|
| 10 | II | 2% (1) | 0.5% (4) | --- | 30 | >60 |
|    | II | 2% (1) | 0.5% (4) | 0.5% (F) | 1 | 7 |
| 11 | III | 2% (k) | 1% (9) | --- | >2 hours | --- |
|    | III | 2% (k) | 1% (9) | 1% (F) | 4 | 19 |
| 12 | I | 2% (e) | 0.5% (4) | --- | >1 day | --- |
|    | I | 2% (e) | 0.5% (4) | 0.5% (F) | 2 | 9 |
| 13 | II | 2% (i) | 0.3% (6) | --- | 16 | 36 |
| 14 | II | 2% (f) | 0.1% (7) | --- | 11 | 29 |
|    | II | 2% (f) | 0.1% (7) | 0.3% (N) | 1 | 3 |
| 15 | II | 2% (i) | 0.3% (9) | --- | 10 | 24 |
|    | II | 2% (i) | 0.3% (9) | 0.5% (O) | 1 | 5 |
| 16 | II | 2% (f) | 0.03% (4) | --- | 28 | 77 |
|    | II | 2% (f) | 0.03% (4) | 0.05% (S) | 3 | 14 |
| 17 | I | 2% (g) | 0.1% (4) | --- | 34 | 86 |
|    | I | 2% (g) | 0.1% (4) | 0.5% (T) | 1 | 3 |
| 18 | I | 2% (e) | 0.5% (5) | --- | >15 hours | --- |
| 19 | I | 2% (h) | 0.1% (5) | --- | 6 | 13 |
|    | I | 2% (h) | 0.1% (5) | 0.2% (P) | 3 | 5 |
|    | I | 2% (h) | 0.1% (5) | 0.5% (Q) | 3 | 6 |
|    | I | 2% (h) | 0.1% (5) | 0.5% (R) | 2 | 4 |
| 20 | I | 2% (d) | 0.1% (4) | --- | 7 | 15 |
|    | I | 2% (d) | 0.1% (4) | 0.5% (V) | 4 | 9 |
|    | I | 2% (d) | 0.1% (4) | 0.5% (W) | 2 | 7 |
|    | I | 2% (d) | 0.1% (4) | 0.5% (X) | 3 | 7 |
| 21[1] | I | 2% (e) | 0.5% (5) | --- | >2 hours | --- |

[1] Test 21 is the only test which has been carried out at a bath temperature of 40° C. and not at room temperature as the other tests.

TABLE 2

| Test No. | Unsaturated polyester resin composition | Type and amount of peroxide | Type and amount of vanadium accelerator | Type and amount of reducing sulfur compound | Time required for complete gelling (gel time), in minutes | Time required to achieve temperature peak (time of exotherm) in minutes | Discoloration of the cured article |
|---|---|---|---|---|---|---|---|
| 1 | I | 0.5% (g) | 0.1% (1) | --- | --- | 60 | Yellow. |
|   | I | 0.5% (g) | 0.01% (1) | 0.05% (A) | --- | 14 | Practically no discoloration. |
| 2 | I | 1% (c) | 0.04% (1) | --- | --- | 24 | Yellowish. |
|   | I | 1% (c) | 0.004% (1) | 0.2% (C) | --- | 24 | No discoloration. |
| 3 | II | 2% (g) | 0.1% (4) | --- | 31 | 65 | Slightly yellowish green. |
|   | II | 2% (g) | 0.01% (4) | 0.5% (E) | 8 | 17 | No discoloration. |
|   | II | 2% (g) | 0.01% (4) | 0.5% (F) | 7 | 22 | Do. |
| 4 | II | 2% (b) | 0.1% (3) | --- | 16 | 34 | Strongly yellow. |
|   | II | 2% (b) | 0.01% (3) | 0.5% (E) | 6 | 17 | Slightly yellowish. |
| 5 | II | 2% (b) | 0.1% (5) | --- | 4 | 15 | Strongly yellow. |
|   | II | 2% (b) | 0.01% (5) | 0.5% (F) | 1 | 9 | Slightly yellowish. |

As has been found, it is also possible to use inorganic reducing sulfur compounds which are soluble in solvents compatible with the unsaturated polyester resins, such as sulfur dioxide.

The following example serves to illustrate the addition of such an inorganic sulfur compound without, however, being limited thereto.

Example 3

The procedure is the same as described in Example 1. The polyester resin composition I described hereinabove is employed and 2%, by weight, of a commercial 70%, by weight, solution of cumene hydroperoxide, as curing catalyst, and 0.2%, by weight, of the solution of vanadyl-p-toluene sulfonate in a mixture of isopropanol and xylene, as curing accelerator, are admixed thereto. The time required for complete gelling (gel time) is 26 minutes while the time required to achieve the temperature peak (time of exotherm) is 55 minutes whereafter curing is substantially completed.

When adding to said polyester resin composition I, cumene hydroperoxide, and vanadyl-p-toluene sulfonate 0.1%, by weight of a 15%, by weight, solution of sulfur dioxide in triethyl phosphate, the gel time is decreased to 1 minute and the time of exotherm to 5 minutes thus showing the surprising accelerating effect of the inorganic reducing sulfur compound.

It may be pointed out that the process of completely polymerizing, hardening and curing of the unsaturated polyester resin compositions according to the present invention represents a special embodiment of the bulk or block polymerization procedure which, as is well known, is carried out in the absence of water, or, respectively, if water is present at all, only in the presence of traces of water. In no instance should there be present a separate aqueous phase, even in a very small amount. The amount of reducing sulfur compound added according to the present invention is rather small and may be between about 0.01% and about 5%, calculated for the unsaturated polyester resin composition, and preferably between about 0.05% and about 0.5%.

Of course, many changes and variations in the unsaturated polyester resin composition, the unsaturated and saturated polycarboxylic acids and polyols forming the polyester and the polymerizable ethylenically unsaturated monomer, the organic peroxide curing catalyst, the vanadium compound accelerator, and the reducing sulfur compound, in the amounts in which these catalysts, accelerators and activators are added, or the curing and hardening time and temperature, and the like may be made by those skilled in the art and in accordance with the claims annexed thereto.

I claim:

1. In a process of effecting final curing of unsaturated polyester resins, the steps which comprise admixing to said unsaturated polyester resin composition
    (a) an organic peroxide curing catalyst,
    (b) a vanadium compound soluble in said unsaturated polyester resin, and
    (c) a reducing sulfur compound
and curing said mixture.

2. In a process of effecting final curing of unsaturated polyester resins, the steps which comprise admixing to said unsaturated polyester resin composition
    (a) an organic peroxide curing catalyst,
    (b) a vanadium compound soluble in said unsaturated polyester resin, and (c) a compound carrying a mercapto group
and curing said mixture.

3. In a process of effecting final curing of unsaturated polyester resins, the steps which comprise admixing to said unsaturated polyester resin composition
   (a) an organic peroxide curing catalyst,
   (b) a vanadium compound soluble in said unsaturated polyester resin, and
   (c) an alcohol carrying a mercapto group,
and curing said mixture.

4. In a process of effecting final curing of unsaturated polyester resins, the steps which comprise admixing to said unsaturated polyester resin composition
   (a) an organic peroxide curing catalyst,
   (b) a vanadium compound soluble in said unsaturated polyester resin, and
   (c) a mercapto carboxylic acid
and curing said mixture.

5. The process according to claim 4, wherein the mercapto carboxylic acid is thioglycolic acid.

6. In a process of effecting final curing of unsaturated polyester resins, the steps which comprise admixing to said unsaturated polyester resin composition
   (a) an organic peroxide curing catalyst,
   (b) a vanadium compound soluble in said unsaturated polyester resin, and
   (c) a mercapto carboxylic acid ester
and curing said mixture.

7. The process according to claim 5, wherein the mercapto carboxylic acid ester is a thioglycolic acid ester.

8. The process according to claim 1, wherein the organic peroxide curing catalyst is a per acid ester.

9. The process according to claim 8, wherein the per acid ester is the tertiary butyl ester of per-($\alpha$-ethyl) hexanoic acid.

10. The process according to claim 1, wherein the reducing sulfur compound is admixed in the form of a solution containing 5% to 50%, by weight, of said sulfur compound.

11. The process according to claim 1, wherein the vanadium compound is admixed in an amount between about 0.000002 part, by weight, and about 0.1 part, by weight, calculated as vanadium metal, and the reducing sulfur compound in an amount between about 0.01 part, by weight, and about 5.0 parts, by weight, per 100 parts, by weight, of the unsaturated polyester resin to be cured.

12. The process according to claim 1, wherein curing is initiated at a temperature above 10° C.

13. The process according to claim 1, wherein curing is effected without supplying heat to the mixture.

References Cited

UNITED STATES PATENTS

| | | | |
|---|---|---|---|
| 2,380,475 | 7/1945 | Stewart | 260—84.1 |
| 2,566,206 | 8/1951 | Hyman | 260—75 |
| 3,003,991 | 10/1961 | Marszewski et al. | 260—75 |
| 3,214,490 | 10/1965 | Leebrick et al. | 260—75 |

WILLIAM H. SHORT, *Primary Examiner.*

SAMUEL H. BLECH, R. T. LYON, *Assistant Examiners.*